United States Patent
Onodera

(10) Patent No.: US 11,396,615 B2
(45) Date of Patent: Jul. 26, 2022

(54) PROTECTIVE FILM

(71) Applicant: SUMITOMO BAKELITE CO., LTD., Shinagawa-ku (JP)

(72) Inventor: Kazufusa Onodera, Shinagawa-ku (JP)

(73) Assignee: SUMITOMO BAKELITE CO., LTD., Shinagawa-ku (JP)

( * ) Notice: Subject to any disclaimer, the term of this patent is extended or adjusted under 35 U.S.C. 154(b) by 0 days.

(21) Appl. No.: 16/607,934

(22) PCT Filed: Apr. 25, 2018

(86) PCT No.: PCT/JP2018/016835
§ 371 (c)(1),
(2) Date: Oct. 24, 2019

(87) PCT Pub. No.: WO2018/199173
PCT Pub. Date: Nov. 1, 2018

(65) Prior Publication Data
US 2020/0385612 A1 Dec. 10, 2020

(30) Foreign Application Priority Data
Apr. 25, 2017 (JP) .............................. JP2017-086684

(51) Int. Cl.
| | |
|---|---|
| *B29C 51/14* | (2006.01) |
| *C09J 7/29* | (2018.01) |
| *C09J 7/38* | (2018.01) |
| *B32B 7/12* | (2006.01) |
| *B32B 27/08* | (2006.01) |
| *B32B 27/32* | (2006.01) |
| *B32B 27/36* | (2006.01) |
| *C09J 123/12* | (2006.01) |
| *C09J 153/00* | (2006.01) |
| *B29K 23/00* | (2006.01) |
| *B29K 69/00* | (2006.01) |
| *B29L 9/00* | (2006.01) |

(52) U.S. Cl.
CPC ................. *C09J 7/29* (2018.01); *B29C 51/14* (2013.01); *B32B 7/12* (2013.01); *B32B 27/08* (2013.01); *B32B 27/32* (2013.01); *B32B 27/365* (2013.01); *C09J 7/387* (2018.01); *C09J 123/12* (2013.01); *C09J 153/00* (2013.01); *B29K 2023/12* (2013.01); *B29K 2069/00* (2013.01); *B29L 2009/00* (2013.01); *B32B 2250/24* (2013.01); *B32B 2255/10* (2013.01); *B32B 2255/26* (2013.01); *B32B 2405/00* (2013.01); *C09J 2423/10* (2013.01); *C09J 2453/00* (2013.01); *Y10T 428/2848* (2015.01); *Y10T 428/2883* (2015.01)

(58) Field of Classification Search
CPC .............. C09J 7/29; C09J 7/387; B29C 51/14
See application file for complete search history.

(56) References Cited

U.S. PATENT DOCUMENTS

| | | | |
|---|---|---|---|
| 4,370,374 A | 1/1983 | Raabe et al. | |
| 6,149,750 A * | 11/2000 | Parish, Jr. ........... | B24B 13/0057 156/154 |
| 2003/0049436 A1* | 3/2003 | Hager ..................... | C08L 23/10 428/343 |
| 2013/0052427 A1* | 2/2013 | Sangster .................. | B32B 3/06 428/172 |
| 2016/0109622 A1 | 4/2016 | Yoshida et al. | |
| 2017/0322344 A1 | 11/2017 | Yoshida et al. | |
| 2021/0024782 A1* | 1/2021 | Onodera ................ | C09J 153/02 |
| 2021/0317340 A1* | 10/2021 | Inaba ..................... | B29C 53/04 |

FOREIGN PATENT DOCUMENTS

| | | |
|---|---|---|
| CN | 102549092 A | 7/2012 |
| EP | 3 006 971 A | 4/2016 |
| JP | 56-64861 A | 6/1981 |
| JP | 2003-145616 A | 5/2003 |
| JP | 2008-246947 A | 10/2008 |
| JP | 2008-273085 A | 11/2008 |
| JP | 2010-275340 A | 12/2010 |
| JP | 2016-47598 A | 4/2016 |
| JP | 2017-81160 A | 5/2017 |
| WO | WO 2014/189078 A1 | 11/2014 |
| WO | WO 2016/080445 A1 | 5/2016 |
| WO | WO 2016/171223 A1 | 10/2016 |
| WO | WO 2018/199172 A1 | 11/2018 |

OTHER PUBLICATIONS

International Search Report dated Jul. 10, 2018 in PCT/JP2018/016835 filed Apr. 25, 2018.

* cited by examiner

*Primary Examiner* — Anish P Desai
(74) *Attorney, Agent, or Firm* — Oblon, McClelland, Maier & Neustadt, L.L.P.

(57) ABSTRACT

A protective film 10 of the present invention is used by being attached to a resin substrate 21 at the time of performing heat bending on the resin substrate 21 while heating the resin substrate 21. The protective film 10 includes a base material layer and a pressure sensitive adhesive layer which is positioned between the base material layer and the resin substrate 21 and is adhered to the resin substrate 21. The base material layer is formed of a laminate having a first layer which is positioned on the opposite side of the pressure sensitive adhesive layer, contains a thermoplastic resin, and has a melting point of 150° C. or higher and a second layer which is positioned on the pressure sensitive adhesive layer side, contains a thermoplastic resin, and has a melting point of lower than 120° C.

20 Claims, 2 Drawing Sheets

PROTECTIVE FILM

TECHNICAL FIELD

The present invention relates to a protective film used by being attached to a resin substrate at the time of performing heat bending on the resin substrate while heating the resin substrate.

BACKGROUND ART

A lens for sunglasses provided with a resin substrate having a configuration in which both surfaces of a polarizer are coated with a coating layer formed of a polycarbonate resin, a polyamide resin, or a cellulose resin is exemplified. Such a lens for sunglasses is produced, for example, in the following manner. First, a protective film is attached to both surfaces of the resin substrate having a flat plate shape in a plan view. In this state, the resin substrate is punched into a predetermined shape such as a circular shape in a plan view. Thereafter, heat bending is performed on this resin substrate while heating the resin substrate. In addition, the protective film is peeled off from the resin substrate on which the heat bending has been performed. Thereafter, a polycarbonate layer is injection-molded on the concave surface of this resin substrate. In this manner, a lens for sunglasses is produced.

This protective film includes, for example, a base material and a pressure sensitive adhesive layer. Specifically, a protective film having a configuration in which abase material mainly formed of a polyolefin-based resin is attached to the resin substrate through a pressure sensitive adhesive layer mainly formed of polyethylene, an ethylene-propylene copolymer, and the like has been suggested (for example, see PTL 1).

However, the protective film having such a configuration has the following problem occurring at the time of peeling the protective film off from the resin substrate after heat bending is performed on the resin substrate. In other words, since a gripping part in which a part of the protective film protrudes from an edge of the resin substrate in the surface direction of the resin substrate is not formed, the protective film cannot be peeled off from the resin substrate using this gripping part as a starting point. As a result, it takes time and effort to peel the protective film off, which is problematic.

Further, the same problem occurs not only in the lenses for sunglasses described above but also resin substrates such as lenses of goggles and visors of helmets.

CITATION LIST

Patent Literature

[PTL 1]: JP2003-145616A

SUMMARY OF INVENTION

Technical Problem

An object of the present invention is to provide a protective film which forms a gripping part with a part of the protective film that protrudes from an edge of a resin substrate in the surface direction of the resin substrate and can be smoothly peeled off from the resin substrate using this gripping part as a starting point without taking time and labor, at the time of peeling the protective film off from the resin substrate after heat bending is performed on the resin substrate.

Solution to Problem

Such an object can be achieved by the present invention described in the following items (1) to (9).

(1) A protective film which is used by being attached to a resin substrate at the time of performing heat bending on the resin substrate while heating the resin substrate, the protective film including: a base material layer; and a pressure sensitive adhesive layer which is positioned between the base material layer and the resin substrate and is adhered to the resin substrate, in which the base material layer is formed of a laminate having a first layer which is positioned on the opposite side of the pressure sensitive adhesive layer, contains a thermoplastic resin, and has a melting point of 150° C. or higher and a second layer which is positioned on the pressure sensitive adhesive layer side, contains a thermoplastic resin, and has a melting point of lower than 120° C.

(2) The protective film according to (1), in which both the thermoplastic resin contained in the first layer and the thermoplastic resin contained in the second layer are polyolefins.

(3) The protective film according to (1) or (2), in which the pressure sensitive adhesive layer contains a polyolefin and an elastomer.

(4) The protective film according to (3), in which the elastomer contained in the pressure sensitive adhesive layer contains a styrene-olefin-styrene block copolymer.

(5) The protective film according to (3) or (4), in which a melt flow rate of the polyolefin contained in the pressure sensitive adhesive layer which is measured under conditions of a heating temperature of 230° C. and a load of 2.16 kgf in conformity with JIS K7210 is in a range of 0.5 g/10 min to 10.0 g/10 min.

(6) The protective film according to any one of (3) to (5), in which the polyolefin contained in the pressure sensitive adhesive layer contains a homopolymer of polypropylene.

(7) The protective film according to any one of (1) to (6), in which a pair of the protective films are respectively attached to both surfaces of the resin substrate.

(8) The protective film according to any one of (1) to (7), in which a coating layer formed of a single layer or a laminate having at least one layer selected from a polycarbonate resin layer, a polyamide resin layer, and a cellulose resin layer is provided on one surface or the other surface of the resin substrate, or in which a pair of the coating layers are respectively provided on both surfaces of the resin substrate.

(9) The protective film according to any one of (1) to (8), in which the resin substrate is subjected to the heat bending by carrying out press molding or vacuum molding.

Advantageous Effects of Invention

According to the present invention, a gripping part in which a part of the protective film protrudes from an edge of the resin substrate in the surface direction of the resin substrate can be formed at the time of peeling the protective film off from the resin substrate after heat bending is performed on the resin substrate. Therefore, the protective film can be smoothly peeled off from the resin substrate using this gripping part as a starting point without taking time and labor. Accordingly, in a case where the resin substrate is applied to, for example, a resin substrate of a lens for sunglasses, a lens for sunglasses can be produced with high productivity.

Further, the resin substrate on which heat bending has been performed can have an excellent appearance. Further, the protective film attached to the resin substrate during this heat bending does not adhere to a mold used for heat bending. In addition, the protective film can be peeled off from the mold with excellent peelability after the heat bending.

DESCRIPTION OF EMBODIMENTS

Hereinafter, a protective film of the present invention will be described in detail based on suitable embodiments illustrated in the accompanying drawings.

The protective film of the present invention is a protective film used by being attached to a resin substrate at the time of performing heat bending on the resin substrate while heating the resin substrate. Such a protective film includes a base material layer and a pressure sensitive adhesive layer which is positioned between the base material layer and the resin substrate and is adhered to the resin substrate, in which the base material layer is formed of a laminate having a first layer which is positioned on the opposite side of the pressure sensitive adhesive layer, contains a thermoplastic resin, and has a melting point of 150° C. or higher and a second layer which is positioned on the pressure sensitive adhesive layer side, contains a thermoplastic resin, and has a melting point of lower than 120° C.

By forming the base material layer included in the protective film with the laminate having such a configuration, a gripping part in which a part of the protective film (first layer) protrudes from an edge of the resin substrate in the surface direction of the resin substrate can be formed after heat bending is performed on the resin substrate. Therefore, the protective film can be smoothly peeled off from the resin substrate using this gripping part as a starting point without taking time and labor at the time of peeling the protective film off from the resin substrate. Accordingly, in a case where the resin substrate is applied to, for example, a resin substrate of a lens for sunglasses, a lens for sunglasses can be produced with high productivity.

Further, the resin substrate on which heat bending has been performed can have an excellent appearance. Further, the protective film attached to the resin substrate during this heat bending does not adhere to a mold used for heat bending. In addition, the protective film can be peeled off from the mold with excellent peelability after the heat bending.

Hereinafter, a method of producing a lens for sunglasses using the protective film of the present invention will be described prior to describing the protective film of the present invention.

<Method of Producing Lens for Sunglasses>

Figure 1:
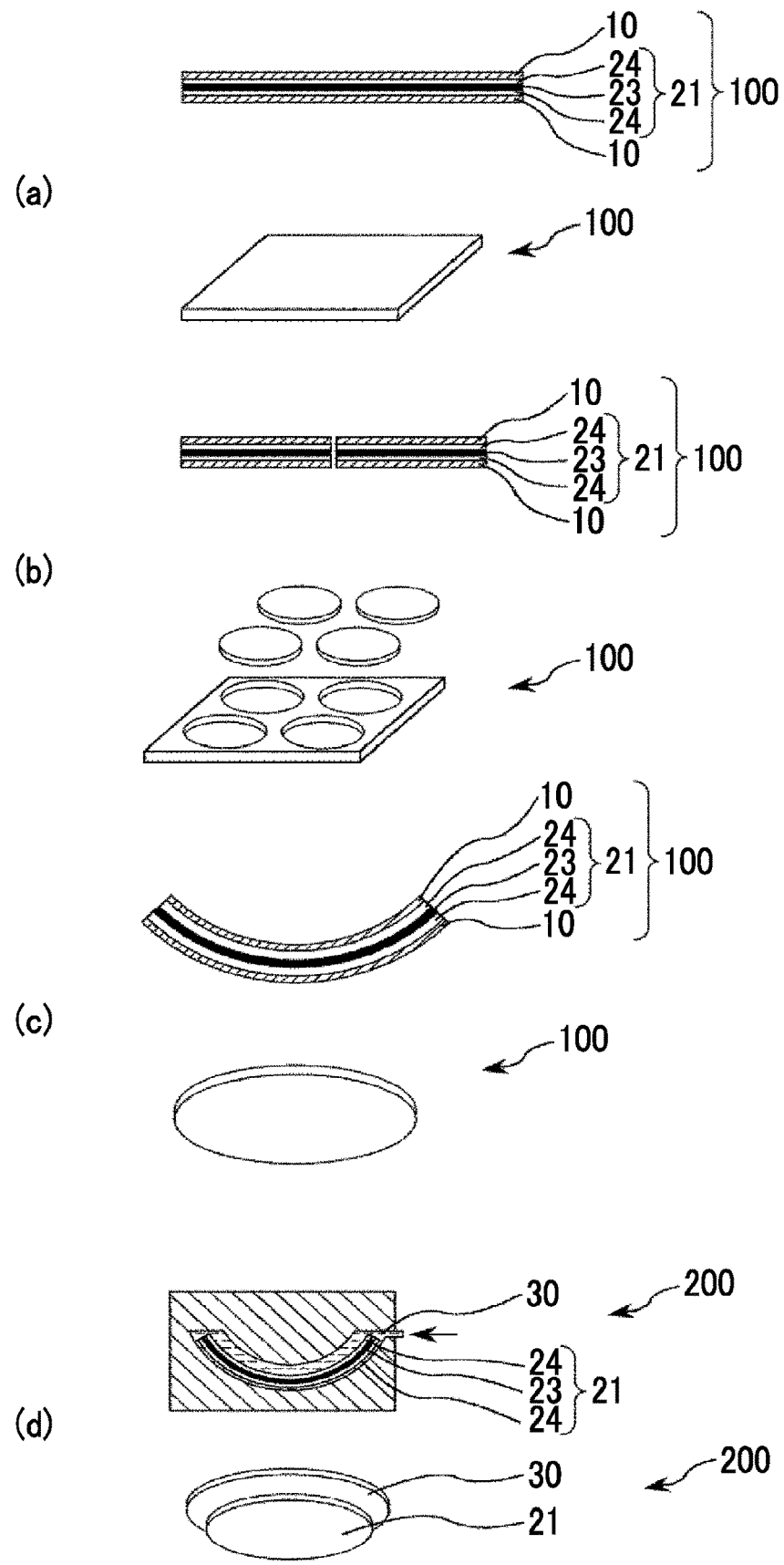
FIG. 1 shows schematic views for describing a method of producing a lens for sunglasses using a protective film.

FIG. 1 shows schematic views for describing a method of producing a lens for sunglasses using the protective film. Hereinafter, for convenience of description, the upper side of FIG. 1 will be referred to as "upper" and the lower side thereof will be referred to as "lower".

Hereinafter, each step in the method of producing a lens for sunglasses will be described in detail.

[1] First, a resin substrate 21 having a flat plate shape is prepared, and a protective film 10 (masking tape) is attached to both surfaces of the resin substrate 21, thereby obtaining a laminate 100 in which the protective film 10 is attached to both surfaces of the resin substrate 21 (see (a) of FIG. 1).

In the present embodiment, the resin substrate 21 including a polarizer 23 and a coating layer 24 is prepared. The polarizer 23 functions as an optical element that extracts linearly polarized light having a polarization surface in one predetermined direction from unpolarized natural light. Both surfaces of the polarizer 23 are coated with the coating layer 24. Further, the coating layer 24 of the resin substrate 21 is formed of a single layer or a laminate having at least one layer selected from a polycarbonate resin layer, a polyamide resin layer, and a cellulose resin layer such as triacetyl cellulose. Further, in addition to a case where the coating layer 24 is formed on both surfaces (surfaces on both sides) of the polarizer 23 as illustrated in (a) of FIG. 1, the coating layer 24 may be formed on any of the upper surface (one surface) and the lower surface (the other surface).

[2] Next, as illustrated in (b) of FIG. 1, the prepared laminate 100, that is, the resin substrate 21 is punched in the thickness direction in a state where the protective film 10 is attached to both surfaces of the resin substrate 21.

In this manner, the laminate 100 can be formed into a circular shape in a plan view.

[3] Next, as illustrated in (c) of FIG. 1, the laminate 100 which has been formed into a circular shape is heat-bended while being heated.

The heat bending is typically performed by press molding or vacuum molding. As described above, in the present embodiment, the resin substrate 21 includes the coating layer 24, and the coating layer 24 is formed of a single layer or a laminate having at least one layer selected from a polycarbonate resin layer, a polyamide resin layer, and a cellulose resin layer. Accordingly, the heating temperature (molding temperature) of the laminate 100 (resin substrate 21) during the heat bending is set to be preferably in a range of 110° C. to 150° C. and more preferably in a range of 140° C. to 150° C. in consideration of the melting temperature or the softening temperature of the coating layer 24. By setting the heating temperature to be in the above-described range, the resin substrate 21 can be reliably heat-bended in a state where the resin substrate 21 is softened or melted while preventing change in quality and deterioration of the resin substrate 21.

[4] Next, as illustrated in (d) of FIG. 1, the protective film 10 is peeled off from the heat-bended resin substrate 21, that is, the heat-bended laminate 100, and a polycarbonate layer 30 formed of a polycarbonate resin is injection-molded on the concave surface of this resin substrate 21. Further, for example, a polyamide layer formed of a polyamide resin may be formed on the concave surface of the resin substrate 21 in place of the polycarbonate layer 30.

In this manner, a lens 200 for sunglasses including the heat-bended resin substrate 21 is produced.

The protective film 10 can be smoothly peeled off from the resin substrate 21 in the step [4] without taking time and labor by applying the protective film of the present invention to the method of producing a lens for sunglasses as described above. Hereinafter, the protective film of the present invention will be described in detail.

<Protective Film 10>

Figure 2:
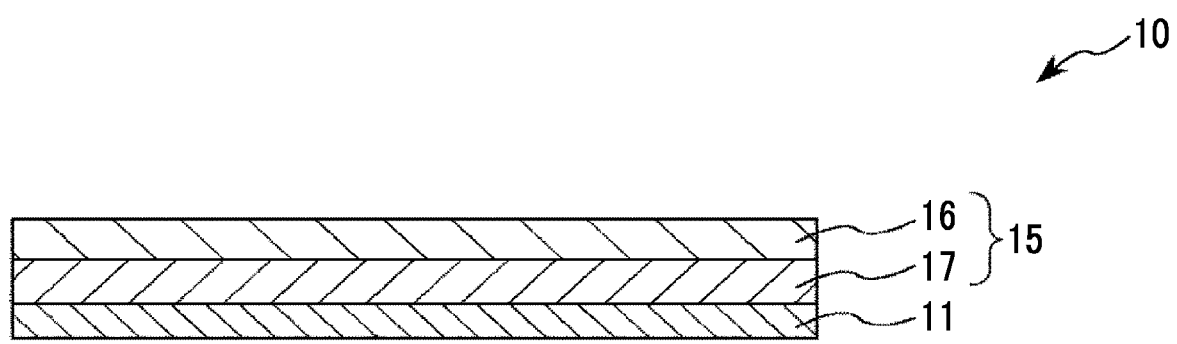
FIG. 2 is a longitudinal cross-sectional view illustrating a suitable embodiment of the protective film of the present invention.

FIG. 2 is a longitudinal cross-sectional view illustrating a suitable embodiment of the protective film of the present invention. Hereinafter, for convenience of description, the upper side of FIG. 2 will be referred to as "upper" and the lower side thereof will be referred to as "lower".

As illustrated in FIG. 2, the protective film 10 includes a base material layer 15 and a pressure sensitive adhesive layer 11 which is positioned between the base material layer 15 and the resin substrate 21 and adheres (is bonded) to the resin substrate 21. Further, the base material layer 15 includes a first layer 16 which is positioned on the opposite side of the pressure sensitive adhesive layer 11, that is, on a molding die side and a second layer 17 which is positioned on the pressure sensitive adhesive layer 11 side, that is, on the resin substrate 21 side.

Hereinafter, each of these layers will be described in detail.

<<Pressure Sensitive Adhesive Layer 11>>

The pressure sensitive adhesive layer 11 is positioned (interposed) between the base material layer 15 and the resin substrate 21 and adheres to the resin substrate 21. In this manner, the pressure sensitive adhesive layer 11 has a function of bonding the base material layer 15 to the resin substrate 21.

In the present invention, the pressure sensitive adhesive layer 11 which enables punching and heat bending of the resin substrate 21 in the step [2] and the step [3] without peeling the protective film 10 off from the resin substrate 21 and enables peeling of the protective film 10 off from the resin substrate 21 in the step [4] is preferably used.

Therefore, it is preferable that the pressure sensitive adhesive layer 11 contains a polyolefin and an elastomer. As described above, the above-described effects can be reliably exhibited by forming the pressure sensitive adhesive layer 11 with both of a polyolefin and an elastomer.

Here, the retention property of the resin substrate 21 due to the protective film 10 in the step [2] and the step [3] and the peelability of the protective film 10 from the resin substrate 21 in the step [4] can be evaluated based on the peel strength with respect to the resin substrate 21 (coating layer 24).

Specifically, the protective film 10 is attached to the coating layer 24 to obtain a laminate. Thereafter, a peel strength $T_1$ between the coating layer 24 and the protective film 10 which is measured after the laminate is stored under a temperature condition of 50° C. for 12 hours in conformity with JISC-6481:1996 and a peel strength $T_2$ between the coating layer 24 and the protective film 10 which is measured after the laminate is stored under a temperature condition of 150° C. for 5 minutes in conformity with JISC-6481:1996 are respectively preferably in a range of 0.05 N/25 mm to 3.0 N/25 mm, more preferably in a range of 0.10 N/25 mm to 1.5 N/25 mm, and still more preferably in a range of 0.15 N/25 mm to 0.5 N/25 mm. By setting the peel strength $T_1$ and the peel strength $T_2$ which are measured after the laminate is stored under a temperature condition of 50° C. for 12 hours and under a temperature condition of 150° C. for 5 minutes to be respectively in the above-described range, punching and heat bending of the resin substrate 21 in the step [2] and the step [3] can be performed without peeling the protective film 10 off from the resin substrate 21, and peeling of the protective film 10 off from the resin substrate 21 in step [4] can be performed even in a case where the protective film 10 has undergone heat history resulting from the heat bending in the step [3].

Further, the melting point of the polyolefin between the polyolefin and the elastomer contained in the pressure sensitive adhesive layer 11 is particularly preferably 150° C. or higher. As described above, in a case where the pressure sensitive adhesive layer 11 contains a polyolefin, punching and heat bending of the resin substrate 21 in the step [2] and the step [3] can be performed without peeling the protective film 10 off from the resin substrate 21, and peeling of the protective film 10 off from the resin substrate 21 in step [4] can be more easily performed.

Further, the melting point of the polyolefin is preferably 150° C. or higher and more preferably in a range of 155° C. to 160° C. In this manner, the above-described effects can be exhibited more significantly.

Further, the polyolefin is not particularly limited, and examples thereof include a polypropylene homopolymer, a polyethylene homopolymer, a propylene-ethylene block copolymer having an EPR phase (rubber phase), an ethylene-vinyl acetate block copolymer, an ethylene-ethyl acrylate block copolymer, and an ethylene-methyl methacrylate block copolymer, and these may be used alone or in combination of two or more kinds thereof. Among these, a polypropylene homopolymer is preferable. A polypropylene homopolymer can be obtained at a relatively low cost, and a polypropylene homopolymer having a melting point of 150° C. or higher can also be easily obtained. Further, transparency can be imparted to the pressure sensitive adhesive layer 11 in a case where the pressure sensitive adhesive layer 11 contains a polypropylene homopolymer. Therefore, in a case where the base material layer 15 also has transparency, the protective film 10 can have transparency. Accordingly, during the attachment of the protective film 10 in the step [1] to the resin substrate 21, it is possible to visually confirm whether waste such as dust is present between the protective film 10 and the resin substrate 21. Therefore, it is possible to reliably prevent the laminate 100 having waste therebetween from being transitioned to the steps subsequent to the step [2]. As the result, the yield of a lens 200 for sunglasses to be obtained can be improved.

Further, the melt flow rate (MFR) of the polyolefin which is measured under a heating temperature condition of 230° C. at a load of 2.16 kgf in conformity with JIS K7210 is preferably in a range of 0.5 g/10 min to 10.0 g/10 min, more preferably in a range of 1.0 g/10 min to 5.0 g/10 min, and still more preferably in a range of 2.0 g/10 min to 3.5 g/10 min. In this manner, since the pressure sensitive adhesive layer 11 having excellent initial familiarity with the coating layer 24 is obtained, the attachment of the protective film 10 to the resin substrate 21 in the step [1] can be performed with excellent adhesiveness.

Further, it is preferable that the pressure sensitive adhesive layer 11 contains an elastomer in addition to the polyolefin as described above. In a case where the pressure sensitive adhesive layer 11 contains an elastomer as described above, it is possible to accurately suppress or prevent the pressure sensitive adhesive layer 11 from remaining on the resin substrate 21 during the peeling of the protective film 10 off from the resin substrate 21 in the step [4]. In other words, it is possible to accurately suppress or prevent adhesive residues from generating on the resin substrate 21. Therefore, the protective film 10 can be more smoothly peeled off from the resin substrate 21.

The elastomer is not particularly limited, and examples thereof include an α-olefin/polyethylene copolymer elastomer, an α-olefin/polypropylene copolymer elastomer, and a styrene block elastomer. Among these, a styrene block elastomer is preferable, and a styrene-olefin-styrene block copolymer elastomer is particularly preferable. As described above, in a case where an elastomer containing styrene is used as a monomer component, it is possible to accurately suppress or prevent adhesive residues from generating on the resin substrate 21 in the step [4]. Further, examples of the α-olefin include 1-hexene, 4-methyl-1-pentene, 1-octene, 1-butene, 1-pentene, and 1-heptene.

In this case, the content of the styrene in the elastomer is preferably 25 wt % or less and more preferably in a range of 10 wt % to 18 wt %. In this manner, it is possible to accurately suppress or prevent an increase in the hardness of the pressure sensitive adhesive layer 11 caused by an increase in the content of styrene. Therefore, it is possible to accurately suppress or prevent adhesive residues from generating on the resin substrate 21 while reliably maintaining the adhesive force of the pressure sensitive adhesive layer 11 against the resin substrate 21 (coating layer 24).

Further, examples of the styrene-olefin-styrene block copolymer include a styrene-isobutylene-styrene block copolymer (SIBS), a styrene-ethylene-butylene-styrene block copolymer (SEBS), a styrene-butadiene-styrene block copolymer (SBS), and a styrene-isoprene-styrene copolymer (SIS). Among these, a styrene-ethylene-butylene-styrene block copolymer (SEBS) is preferable. In a case where SEBS is selected as the styrene-olefin-styrene block copolymer, the content of the styrene in the elastomer can be easily set to 25 wt % or less, and the above-described effects can be reliably obtained.

The content of the elastomer in the pressure sensitive adhesive layer 11 is not particularly limited, but is set to be preferably in a range of 20 wt % to 80 wt % and more preferably in a range of 30 wt % to 60 wt %. In this manner, the effects obtained by allowing the pressure sensitive adhesive layer 11 to contain an elastomer can be exhibited more significantly.

In the present specification, the melting point of the respective layers constituting the protective film 10 including the pressure sensitive adhesive layer 11 is acquired by multiplying the melting point (the peak temperature obtained by DSC measurement) of each constituent material contained in each layer by the ratio of each constituent material and summing the obtained values, and the acquired value is set as the melting point.

Further, the average thickness of the pressure sensitive adhesive layer 11 is preferably in a range of 5 μm to 40 μm and more preferably in a range of 10 μm to 20 μm. In this manner, the above-described functions as the pressure sensitive adhesive layer 11 can be reliably exhibited.

<<Base Material Layer 15>>

The base material layer 15 is bonded to the resin substrate 21 (coating layer 24) through the pressure sensitive adhesive layer 11. The base material layer 15 functions as a functional layer (protective layer) that protects (masks) the resin substrate 21 during the punching and the heat bending of the resin substrate 21 in the step [2] and the step [3]. In addition, the base material layer 15 also functions as a functional layer (protective layer) for peeling (releasing) the resin substrate 21 (protective film 10) off from a mold used for heat bending after the heat bending in the step [3].

Further, the base material layer 15 forms a gripping part in which a part of the protective film 10 protrudes from an edge of the resin substrate 21 in the surface direction of the resin substrate 21 during the peeling of the protective film 10 off from the resin substrate 21 in the step [4]. The base material layer 15 also functions as a functional layer for peeling of the protective film 10 using this gripping part as a starting point. Therefore, the protective film can be smoothly peeled off from the resin substrate using the gripping part as a starting point without taking time and effort.

In the present invention, in order to allow the base material layer 15 to exhibit these functions, as illustrated in FIG. 2, the base material layer 15 is formed of a laminate having the first layer 16 which is positioned on the opposite side of the pressure sensitive adhesive layer 11, contains a thermoplastic resin, and has a melting point of 150° C. or higher and the second layer 17 which is positioned on the pressure sensitive adhesive layer 11 side, contains a thermoplastic resin, and has a melting point of lower than 120° C. Hereinafter, the first layer 16 and the second layer 17 will be described.

<<First Layer 16>>

The first layer 16 is positioned on the opposite side of the pressure sensitive adhesive layer 11, in other words, on a molding die side during the heat bending in the step [3]. Therefore, the first layer 16 functions as an outermost layer that protects the resin substrate 21 and peels (releases) the resin substrate 21 (protective film 10) off from the mold used for heat bending after the heat bending in the step [3]. The first layer 16 further functions as a gripping part formed by protrusion in the surface direction of the resin substrate 21 during the peeling of the protective film 10 off from the resin substrate 21 in the step [4].

The first layer 16 contains a thermoplastic resin, and the melting point thereof is set from the following viewpoints. In other words, the first layer 16 contains a thermoplastic resin, and the melting point thereof is set to 150° C. or higher and preferably in a range of 155° C. to 165° C. for the purpose of maintaining excellent peelability (releasability) from the molding die after the heat bending in the step [3], in other words, allowing the first layer 16 not to adhere to the mold (die), and allowing the first layer 16 to function as a gripping part during the peeling of the protective film 10 off from the resin substrate 21 in the step [4].

Here, as described above, the heating temperature of the coating layer 24 (resin substrate 21) during the heat bending in the step [3] is set to be preferably in a range of 110° C. to 150° C.

Therefore, it is possible to reliably prevent the first layer 16 from entering a melted or softened state during the heat bending in the step [3] by setting the melting point of the first layer 16 to be in the above-described range. Accordingly, it is possible to reliably peel (release) the laminate 100 from the molding die after the heat bending in the step [3]. Further, the first layer 16 can be used as a gripping part during the peeling of the protective film 10 in the step [4].

The constituent material of the first layer 16 is not particularly limited as long as the constituent material contains a thermoplastic resin and is capable of setting the melting point of the first layer 16 to 150° C. or higher. A thermoplastic resin having a melting point of 150° C. or higher is preferably exemplified, and a polyolefin having a melting point of 150° C. or higher is more preferably selected. In this manner, the melting point of the first layer 16 can easily be set to 150° C. or higher. Further, in a case where the second layer 17 described below is also formed to contain a polyolefin and both the first layer 16 and the second layer 17 are formed to contain a polyolefin, since the adhesiveness between the base material layer 15 (the first layer 16 and the second layer 17) and the pressure sensitive adhesive layer 11 can be improved, it is possible to accurately suppress or prevent each layer of the protective film 10 from being peeled off.

For example, among the polyolefins contained in the above-described pressure sensitive adhesive layer 11, a polyolefin having a melting point of 150° C. or higher is exemplified as the polyolefin having a melting point of 150° C. or higher.

Further, the average thickness of the first layer 16 is preferably in a range of 10 µm to 50 µm and more preferably in a range of 15 µm to 35 µm. In this manner, the above-described functions as the first layer 16 can be reliably exhibited.

<<Second Layer 17>>

The second layer 17 is positioned on the pressure sensitive adhesive layer 11 side, that is, the resin substrate 21 side and functions as an intermediate layer positioned between the pressure sensitive adhesive layer 11 and the first layer 16.

The second layer 17 is provided on the base material layer 15 for the purpose of entering a melted or softened state during the heat bending in the step [3], being positioned between the first layer 16 positioned on the molding die side and the resin substrate 21 to protect the resin substrate 21, and functioning as an intermediate layer for forming a gripping part formed by protrusion of the first layer 16 from an edge of the curved surface of the laminate 100 due to the heat bending of the laminate 100 in the surface direction of the resin substrate 21. Therefore, the second layer 17 contains a thermoplastic resin, and the melting point thereof is lower than 120° C., preferably in a range of 90° C. to 119° C., and more preferably in a range of 105° C. to 115° C.

Here, as described above, the heating temperature of the coating layer 24 (resin substrate 21) during the heat bending in the step [3] is set to be preferably in a range of 110° C. to 150° C. Therefore, it is possible to reliably make the second layer 17 enter a melted or softened state during the heat bending in the step [3] by setting the melting point of the second layer 17 to be in the above-described range. Therefore, in the step [3], the second layer 17 exhibits the function as the intermediate layer in a melted or softened state and also functions as a cushion layer that protects the resin substrate 21 between the first layer 16 positioned on the molding die side and the resin substrate 21. As the result, the resin substrate 21 can be heat-bended while accurately suppressing or preventing formation of unevenness on the surface of the resin substrate 21 due to transfer of the mold surface shape. Accordingly, the heat-bended resin substrate 21 having an excellent appearance is obtained. Further, the first layer 16 can be shifted in the surface direction of the resin substrate 21 due to such a second layer 17. As the result, a gripping part formed of the first layer 16 is formed on the edge of the laminate 100. Accordingly, the protruding portion of the first layer 16 can be used as a gripping part, and the protective film 10 can be easily peeled off from the resin substrate during the peeling of the protective film 10 in the step [4].

Further, in a case where the length of this gripping part is set as $L_1$, the diameter of the laminate 100 in a plan view after the laminate 100 having a circular shape in a plan view is heat-bended in the step [3] is set as $L_2$, and a radius R of curvature of the laminate 100 which has been heat-bended in the step [3] is set to 8.5 cm, "$(L_1/L_2) \times 100$" is preferably in a range of 0.1% to 1.0% and more preferably in a range of 0.2% to 0.5%. In a case where such a relationship is satisfied, the peeling of the protective film 10 in the step [4] can be reliably performed using the gripping part formed in the step [3].

The constituent material of the second layer 17 is not particularly limited as long as the constituent material contains a thermoplastic resin and is capable of setting the melting point of the second layer 17 to lower than 120° C. A thermoplastic resin having a melting point of lower than 120° C. is preferably exemplified, and a polyolefin having a melting point of lower than 120° C. is more preferably selected. In this manner, the melting point of the second layer 17 can easily be set to lower than 120° C. Further, in a case where the first layer 16 described above is also formed to contain a polyolefin and both the first layer 16 and the second layer 17 are formed to contain a polyolefin, since the adhesiveness between the base material layer 15 (the first layer 16 and the second layer 17) and the pressure sensitive adhesive layer 11 can be improved. Therefore, it is possible to accurately suppress or prevent each layer of the protective film 10 from being peeled off.

For example, among the polyolefins contained in the above-described pressure sensitive adhesive layer 11, a polyolefin having a melting point of lower than 120° C. is exemplified as the polyolefin having a melting point of lower than 120° C. Examples thereof include a polyethylene homopolymer having a melting point of lower than 120° C., an α-olefin/polyethylene copolymer having a melting point of lower than 120° C., and an α-olefin/polypropylene copolymer having a melting point of lower than 120° C.

Further, the average thickness of the second layer 17 is preferably in a range of 10 µm to 60 µm and more preferably in a range of 15 µm to 30 µm. In this manner, the above-described functions as the second layer 17 can be reliably exhibited.

Further, the pressure sensitive adhesive layer 11 and each layer of the base material layer 15 (the first layer 16 and the second layer 17) in the above-described protective film 10 may contain various additives such as an antioxidant, a light stabilizer, and an antistatic agent in addition to the above-described constituent materials. In addition, an intermediate layer containing the above-described additives may be formed between these layers.

Further, the above-described protective film 10 may be produced using any method. For example, the protective film 10 can be produced using a co-extrusion method.

Specifically, three extruders are prepared, and the constituent materials of the pressure sensitive adhesive layer 11, the first layer 16, and the second layer 17 are respectively stored in these extruders. Thereafter, these constituent materials are extruded in a melted or softened state. In this manner, a laminate in a melted or softened state, in which these constituent materials are laminated in layers, is obtained from a co-extrusion T die. The obtained laminate is supplied to a sheet molding unit configured of a plurality of cooling rolls and then is cooled in this sheet molding unit, thereby producing the protective film 10.

Hereinbefore, the protective film of the present invention has been described, but the present invention is not limited thereto. Further, each layer constituting the protective film can be replaced with a layer which is capable of exhibiting the same function and has an optional configuration.

In the embodiment, the case where the protective film of the present invention is used by being attached to the resin substrate during heat bending of the resin substrate in lenses for sunglasses has been described. However, the protective film of the present invention can be applied to heat bending of the resin substrate in lenses for sunglasses and can also be used for heat bending of the resin substrate in lenses of goggles, visors of helmets, and the like.

EXAMPLES

Hereinafter, the present invention will be described in detail based on examples. Further, the present invention is not limited to these examples.

1. Examination for Configuration of Base Material Layer 1-1. Preparation of Raw Materials First, raw materials used for preparation of the protective films of examples and comparative examples are as follows.

<Polyolefin>

Homo polypropylene having melting point of 158° C. (manufactured by Japan Polypropylene Corporation, "NOVATEC EA9", MFR=0.5 g/10 min)

Random polypropylene having melting point of 145° C. (manufactured by Japan Polypropylene Corporation, "NOVATEC EG8B", MFR=0.8 g/10 min)

Random polypropylene having melting point of 132° C. (manufactured by Sumitomo Chemical Co., Ltd., "NOBLEN S131", MFR=1.5 g/10 min) Linear low density polyethylene having melting point of 119° C. (manufactured by Ube-Maruzen Polyethylene Co., Ltd., "UMERIT 1540F", MFR=4.0 g/10 min)

Linear low density polyethylene having melting point of 114° C. (manufactured by Ube-Maruzen Polyethylene Co., Ltd., "UMERIT 1520F", MFR=2.0 g/10 min)

Low density polyethylene having melting point of 110° C. (manufactured by Ube-Maruzen Polyethylene Co., Ltd., "Ube Polyethylene F022NH", MFR=0.8 g/10 min)

Homo polypropylene having melting point of 158° C. (manufactured by Sumitomo Chemical Co., Ltd., "NOBLEN FS2011DG2", MFR=2.5 g/10 min)

<Elastomer>

Styrene-ethylene-butylene-styrene block copolymer (SEBS) (manufactured by Asahi Kasei Corporation, "TUFTEC H1221")

1-2. Production of Protective Film

Example 1A

[1A] First, SEBS and homo polypropylene (NOBLEN FS2011DG2) having a melting point of 158° C. were kneaded such that the content of the SEBS was set to 50 wt % during formation of a pressure sensitive adhesive layer, thereby preparing a pressure sensitive adhesive layer forming material (resin composition).

[2A] Next, the prepared pressure sensitive adhesive layer forming material, linear low density polyethylene having a melting point of 119° C. as a second layer (intermediate layer) forming material, and homo polypropylene (NOVATEC EA9) having a melting point of 158° C. as a first layer (outermost layer) forming material were respectively stored in three extruders.

[3A] Next, these forming materials were extruded in a melted state from these three extruders. In this manner, a laminate in a melted state in which these forming materials were laminated in layers was obtained from a co-extrusion T die. Thereafter, a protective film of Example 1A was obtained by cooling this laminate.

Examples 2A to 7A and Comparative Examples 1A to 4A

Each protective film of Examples 2A to 7A and Comparative Examples 1A to 4A was obtained in the same manner as in Example 1A except that the kind of polyolefin used as the second layer forming material in the step [2A], the kind of polyolefin used as the first layer forming material in the step [2A], the content of the polyolefin contained in the second layer forming material in the step [2A], and the average thickness of the second layer in the laminate to be formed in the step [3A] were respectively changed as listed in Table 1.

1-3. Evaluation

The protective films of each example and each comparative example were evaluated according to the following method.

<1> Evaluation of Size of Gripping Part

First, a resin substrate ("P1352", manufactured by Sumitomo Bakelite Co., Ltd.) formed by interposing a polarizer between two polycarbonate substrates (polycarbonate layers) was prepared for the protective film of each example and each comparative example. Each protective film was pressure-bonded on both surfaces of each resin substrate under a condition of a load of 0.5 kg/cm$^2$ using a roll so that the protective film was attached thereto, thereby obtaining a laminate. Thereafter, the laminate was punched in the thickness direction. In this manner, the laminate was formed into a circular shape (diameter of 7.5 cm) in a plan view.

Next, the laminate which had been formed into a circular shape was heat-bended by performing press molding while being heated at 150° C. In this manner, the circular laminate was formed into a curved shape whose radius R of curvature was 8.5 cm.

Further, a length $L_1$ of the gripping part in the laminate which had been heat-bended and a diameter $L_2$ thereof in a plan view were measured, and $(L_1/L_2) \times 100$ was acquired. The obtained calculation result of $(L_1/L_2) \times 100$ was evaluated based on the following evaluation criteria.

A: The calculation result was in a range of 0.2% to 0.5%.

B: The calculation result was 0.1% or greater and less than 0.2% or greater than 0.5% and 1.0% or less.

C: The calculation result was less than 0.1% or greater than 1.0%.

<2> Evaluation of Appearance of Resin Substrate after Heat Bending

First, a resin substrate ("P1352", manufactured by Sumitomo Bakelite Co., Ltd.) formed by interposing a polarizer between two polycarbonate substrates (polycarbonate layers) was prepared for the protective film of each example and each comparative example. Each protective film was pressure-bonded on both surfaces of each resin substrate under a condition of a load of 0.5 kg/cm$^2$ using a roll so that the protective film was attached thereto, thereby obtaining a laminate. Thereafter, the laminate was punched in the thickness direction. In this manner, the laminate was formed into a circular shape (diameter of 7.5 cm) in a plan view.

Next, the laminate which had been formed into a circular shape was heat-bended by performing press molding while being heated at 150° C. In this manner, the circular laminate was formed into a curved shape whose radius R of curvature was 8.5 cm. Thereafter, the protective film was peeled off from the laminate which had been heat-bended.

Further, the appearance of the surface of the heat-bended resin substrate from which the protective film had been peeled off was evaluated based on the following evaluation criteria.

A: Transfer of the mold was not found at all, and the smoothness was the same as that before molding.

B: Transfer of the mold somewhat occurred, but there is no problem in practical use.

C: Unevenness caused by transfer of the mold was so significant that practical use was not possible.

<3> Evaluation of Peelability from Mold

First, a resin substrate ("P1352", manufactured by Sumitomo Bakelite Co., Ltd.) formed by interposing a polarizer between two polycarbonate substrates (polycarbonate layers) was prepared for the protective film of each example and each comparative example. Each protective film was pressure-bonded on both surfaces of each resin substrate under a condition of a load of 0.5 kg/cm² using a roll so that the protective film was attached thereto, thereby obtaining a laminate. Thereafter, the laminate was punched in the thickness direction. In this manner, the laminate was formed into a circular shape (diameter of 7.5 cm) in a plan view.

Next, the laminate which had been formed into a circular shape was heat-bended by performing press molding while being heated at 150° C. In this manner, the circular laminate was formed into a curved shape whose radius R of curvature was 8.5 cm.

Further, the peelability of the laminate, which had been heat-bended, at the time of being peeled off from the mold used for press molding was evaluated based on the following evaluation criteria.

A: The laminate was able to be peeled off easily.

B: The laminate was somewhat adhered to the mold, but was able to be peeled off.

C: Since the laminate was adhered to the mold, the laminate was not able to be peeled off.

The evaluation results of the protective film of each example and each comparative example, which had been obtained in the above-described manner, are listed in Table 1.

TABLE 1

| | | | MFR | Tensile elasticity | Example 1A | Example 2A | Example 3A | Example 4A | Example 5A | Example 6A |
|---|---|---|---|---|---|---|---|---|---|---|
| First layer | Configuration of first layer | Homo polypropylene having melting point of 158° C. "NOVATEC EA9" (wt %) | 0.5 | 1600 | 100 | 100 | 100 | 100 | 100 | 100 |
| | | Random polypropylene having melting point of 145° C. "NOVATEC EG8B" (wt %) | 0.8 | 950 | | | | | | |
| | | Average thickness (nm) | | | | | | 20 | | |
| Second layer | Configuration of second layer | Linear low density polyethylene having melting point of 119° C. "UMERIT 1540F" (wt %) | 4.0 | 190 | 100 | | | 50 | | |
| | | Linear low density polyethylene having melting point of 114° C. "UMERIT 1520F" (wt %) | 2.0 | 190 | | 100 | | | | 100 |
| | | Low density polyethylene having melting point of 110° C. "Ube Polyethylene F022NH" (wt %) | 0.8 | | | | 100 | 50 | 50 | |
| | | Homo polypropylene having melting point of 158° C. "NOVATEC EA9" (wt %) | 0.5 | 1600 | | | | | | |
| | | Random polypropylene having melting point of 145° C. "NOVATEC EG8B" (wt %) | 0.8 | 950 | | | | | | |
| | | Random polypropylene having melting point of 132° C. "NOBLEN S131" (wt %) | 1.5 | 650 | | | | | 50 | |
| | | Melting point of second layer (° C.) | | | 119 | 114 | 110 | 114.5 | 116 | 114 |
| | | Average thickness (nm) | | | 35 | 35 | 35 | 35 | 35 | 15 |
| Pressure sensitive adhesive layer | Configuration of pressure sensitive adhesive layer | Homo polypropylene having melting point of 158° C. "NOBLEN FSP011DG2" (wt %) | 2.5 | 1500 | | | | 50 | | |
| | | Styrene-ethylene-butylene-styrene block copolymer "TUFTEC H1221" (wt %) | | | | | | 50 | | |
| | | Average thickness (nm) | | | | | | 15 | | |
| Evaluation results | | Gripping part (($L_1/L_2$) × 100) (%) | | | B | A | A | A | A | A |
| | | Appearance of surface of resin substrate after molding | | | A | A | A | A | A | B |
| | | peelability from mold | | | A | A | A | A | A | A |

| | | | MFR | Tensile elasticity | Example 7A | Comparative Example 1A | Comparative Example 2A | Comparative Example 3A | Comparative Example 4A |
|---|---|---|---|---|---|---|---|---|---|
| First layer | Configuration of first layer | Homo polypropylene having melting point of 158° C. "NOVATEC EA9" (wt %) | 0.5 | 1600 | 100 | | 100 | 100 | 100 |
| | | Random polypropylene having melting point of 145° C. "NOVATEC EG8B" (wt %) | 0.8 | 950 | | 100 | | | |
| | | Average thickness (nm) | | | | | 20 | | |
| Second layer | Configuration of second layer | Linear low density polyethylene having melting point of 119° C. "UMERIT 1540F" (wt %) | 4.0 | 190 | | | | | 75 |
| | | Linear low density polyethylene having melting point of 114° C. "UMERIT 1520F" (wt %) | 2.0 | 190 | 100 | 100 | | | |

TABLE 1-continued

|  |  |  |  |  |  |  |  |  |
|---|---|---|---|---|---|---|---|---|
|  |  | Low density polyethylene having melting point of 110° C. "Ube Polyethylene F022NH" (wt %) | 0.8 |  |  |  |  |  |
|  |  | Homo polypropylene having melting point of 158° C. "NOVATEC EA9" (wt %) | 0.5 | 1600 |  | 100 |  |  |
|  |  | Random polypropylene having melting point of 145° C. "NOVATEC EG8B" (wt %) | 0.8 | 950 |  |  |  | 25 |
|  |  | Random polypropylene having melting point of 132° C. "NOBLEN S131" (wt %) | 1.5 | 650 |  |  | 100 |  |
|  |  | Melting point of second layer (° C.) |  |  | 114 | 114 | 158 | 132 | 125.5 |
|  |  | Average thickness (nn) |  |  | 60 | 35 | 35 | 35 | 35 |
| Pressure sensitive adhesive layer | Configuration of pressure sensitive adhesive layer | Homo polypropylene having melting point of 158° C. "NOBLEN FSP011DG2" (wt %) | 2.5 | 1500 |  | 50 |  |  |
|  |  | Styrene-ethylene-butylene-styrene block copolymer "TUFTEC H1221" (wt %) |  |  |  | 50 |  |  |
|  |  | Average thickness (nm) |  |  |  | 15 |  |  |
| Evaluation results |  | Gripping part (($L_1/L_2$) × 100) (%) |  |  | A | A | C | C | C |
|  |  | Appearance of surface of resin substrate after molding |  |  | A | A | C | B | A |
|  |  | peelability from mold |  |  | A | C | A | A | A |

As listed in Table 1, in the protective film of each example, the melting point of the second layer was set to lower than 120° C. so that the size of ($L_1/L_2$)×100 as an index of the gripping part was set to be in a range of 0.1% to 1.0%. Therefore, it was found that this gripping part was able to be used as the gripping part during the peeling of the protective film in the step [4], and the protective film was able to be peeled off easily. Further, it was found that in a case where the protective film of each example was used, unevenness caused by transfer of the surface shape of the mold was not recognized on the surface of the heat-bended resin substrate, and the resin substrate was able to be heat-bended with an excellent appearance.

In the protective film of each example, the melting point of the first layer was set to 150° C. or higher. Therefore, it was found that in the case where the protective film of each example was used, the heat-bended laminate was able to be peeled off with excellent peelability without adhering the protective film to the mold after the heat bending in the step [3].

On the contrary, in the protective film of each comparative example which was provided with the second layer having a melting point of 120° C. or higher, the size of ($L_1/L_2$)×100 was set to less than 0.1% or greater than 1.0%. This result indicates that the formed gripping part was not able to be used as the gripping part for peeling the protective film in the step [4]. Further, in a case where the protective film of Comparative Example 2A which was provided with the second layer having a melting point of higher than 145° C. was used, there was a tendency that unevenness caused by transfer of the surface shape of the mold was found on the surface of the heat-bended resin substrate and the resin substrate with a poor appearance was obtained by heat bending.

Further, in a case where the protective film of Comparative Example 1A which was provided with the first layer having a melting point of lower than 150° C. was used, the protective film was adhered to the mold after the heat bending in the step [3], and the heat-bended laminate was not able to be peeled off from the mold due to the adhesion of the protective film to the mold.

2. Examination of Kind of Elastomer Contained in Pressure Sensitive Adhesive Layer 2-1. Preparation of Raw Materials First, raw materials used for preparation of the protective films of examples are as follows.

<Polyolefin>

Homo polypropylene having melting point of 158° C. (manufactured by Sumitomo Chemical Co., Ltd., "NOBLEN FS2011DG2", MFR=2.5 g/10 min)

Homo polypropylene having melting point of 158° C. (manufactured by Japan Polypropylene Corporation, "NOVATEC EA9", MFR=0.5 g/10 min)

Linear low density polyethylene having melting point of 119° C. (manufactured by Ube-Maruzen Polyethylene Co., Ltd., "UMERIT 1540F", MFR=4.0 g/10 min)

<Elastomer>

Styrene-ethylene-butylene-styrene block copolymer (SEBS) (manufactured by Asahi Kasei Corporation, "TUFTEC H1221")

Styrene-isobutylene-styrene block copolymer (SIBS) ("SIBSTAR 062H", manufactured by Kaneka Corporation)

α-Olefin/polypropylene copolymer elastomer ("TAFMER PN2060", manufactured by Mitsui Chemicals, Inc.)

α-Olefin/polyethylene copolymer elastomer ("KERNEL KF350", manufactured by Japan Polypropylene Corporation)

2-2. Production of Protective Film

Example 1B

[1B] First, SEBS and homo polypropylene (NOBLEN FS2011DG2) having a melting point of 158° C. were kneaded such that the content of the SEBS was set to 50 wt % during formation of a pressure sensitive adhesive layer, thereby preparing a pressure sensitive adhesive layer forming material (resin composition).

[2B] Next, the prepared pressure sensitive adhesive layer forming material, linear low density polyethylene having a melting point of 119° C. as a second layer (intermediate layer) forming material, and homo polypropylene (NOVATEC EA9) having a melting point of 158° C. as a first layer (outermost layer) forming material were respectively stored in three extruders.

[3B] Next, these forming materials were extruded in a melted state from these three extruders. In this manner, a laminate in a melted state in which these forming materials were laminated in layers was obtained from a co-extrusion T die. Thereafter, a protective film of Example 1B was obtained by cooling this laminate.

Example 2B

The protective film of Example 2B was obtained in the same manner as in Example 1B except that SIBS was used in place of SEBS in the step [1B].

Example 3B

The protective film of Example 3B was obtained in the same manner as in Example 1B except that an α-olefin/polypropylene copolymer elastomer was used in place of SEBS in the step [1B].

Example 4B

The protective film of Example 4B was obtained in the same manner as in Example 1B except that an α-olefin/polypropylene copolymer elastomer was used in place of SEBS in the step [1B].

2-3. Evaluation

The protective film of each example were evaluated according to the following method.

<1> Evaluation of Adhesiveness Before Heat Bending

First, a resin substrate ("P1352", manufactured by Sumitomo Bakelite Co., Ltd.) formed by interposing a polarizer between two polycarbonate substrates (polycarbonate layers) was prepared for the protective film of each example. Each protective film was pressure-bonded on both surfaces of each resin substrate under a condition of a load of 0.5 kg/cm$^2$ using a roll so that the protective film was attached thereto, thereby obtaining a laminate.

Next, the peel strength between the polycarbonate substrate and the protective film was measured in conformity with JISC-6481: 1996. In addition, the obtained peel strength was evaluated based on the following evaluation criteria.

A: The peel strength was in a range of 0.10 N/25 mm to 1.5 N/25 mm.

B: The peel strength was 0.05 N/25 mm or greater and less than 0.10 N/mm or greater than 1.5 N/25 mm and 3.0 N/25 mm or less.

C: The peel strength was less than 0.05 N/25 mm or greater than 3.0 N/25 mm.

<2> Evaluation of adhesive residues after heat bending

First, a resin substrate ("P1352", manufactured by Sumitomo Bakelite Co., Ltd.) formed by interposing a polarizer between two polycarbonate substrates (polycarbonate layers) was prepared for the protective film of each example and each comparative example. Each protective film was pressure-bonded on both surfaces of each resin substrate under a condition of a load of 0.5 kg/cm$^2$ using a roll so that the protective film was attached thereto, thereby obtaining a laminate.

Next, the obtained laminate was heat-bended by vacuum molding while being heated at a heating temperature of 150° C. In the heat-bended laminate, the protective film was peeled off from the polycarbonate substrate, and the presence of adhesive residues on the polycarbonate substrate was observed. Further, the observation results of whether adhesive residues were present were evaluated based on the following evaluation criteria.

A: Adhesive residues were not found at all.

B: A small amount of adhesive residues were found.

C: Adhesive residues were clearly found.

The evaluation results of the protective film of each example, which had been obtained in the above-described manner, are listed in Table 2.

TABLE 2

| | | | Content of styrene (wt %) | Example 1B | Example 2B | Example 3B | Example 4B |
|---|---|---|---|---|---|---|---|
| First layer | Configuration of first layer | Homo polypropylene having melting point of 158° C. "NOVATEC EA9" (wt %) | — | 100 | 100 | 100 | 100 |
| | | Average thickness (nm) | | 20 | 20 | 20 | 20 |
| Second layer | Configuration of second layer | Low density polyethylene having melting point of 119° C. "UMBRIT 1540F" (wt %) | — | 100 | 100 | 100 | 100 |
| | | Average thickness (nm) | | 35 | 35 | 35 | 35 |
| Pressure sensitive adhesive layer | Configuration of pressure sensitive adhesive layer | Homo polypropylene having melting point of 158° C. "NOBLEN FS2011DG2" (wt %) | — | 50 | 50 | 50 | 50 |
| | | Styrene-ethylene-butylene-styrene block copolymer "TUFTEC H1221" (wt %) | 12 | 50 | | | |
| | | Styrene-isobutylene-styrene block copolymer "SIBSTAR 062H" (wt %) | 20 | | 50 | | |
| | | α-Olefin/polypropylene copolymer elastomer "TAFMER PN2060" (wt %) | — | | | 50 | |
| | | α-Olefin/polyethylene copolymer elastomer "KERNEL KF350" (wt %) | — | | | | 50 |
| | | Average thickness (nm) | | 15 | 15 | 15 | 15 |
| Evaluation results | | Adhesiveness before heat bending | | A | B | A | A |
| | | Adhesive residues after heat bending | | A | B | B | B |

As listed in Table 2, an elastomer was contained in the pressure sensitive adhesive layer of the protective film in each example. Therefore, in each example, the protective film was able to be peeled off from the polycarbonate substrate without recognizing adhesive residues on the polycarbonate substrate in the heat-bended laminate of the polycarbonate and the protective film.

3. Examination of Melting Point of Polyolefin Contained in Pressure Sensitive Adhesive Layer 3-1. Preparation of Raw Materials First, raw materials used for preparation of the protective films of examples are as follows.

<Polyolefin>

Homo polypropylene having melting point of 158° C. (manufactured by Sumitomo Chemical Co., Ltd., "NOBLEN FS2011DG2", MFR=2.5 g/10 min)

Homo polypropylene having melting point of 158° C. (manufactured by Japan Polypropylene Corporation, "NOVATEC EA9", MFR=0.5 g/10 min)

Homo polypropylene having melting point of 158° C. (manufactured by Sumitomo Chemical Co., Ltd., "NOBLEN WF836DG3", MFR=7.0 g/10 min)

Block polypropylene having melting point of 155° C. (propylene-ethylene block copolymer having EPR phase (rubber phase)) (manufactured by Japan Polypropylene Corporation, "NOVATEC EC9GD", MFR=0.5 g/10 min)

Random polypropylene having melting point of 145° C. (manufactured by Japan Polypropylene Corporation, "NOVATEC EG8B", MFR=0.8 g/10 min)

Linear low density polyethylene having melting point of 119° C. (manufactured by Ube-Maruzen Polyethylene Co., Ltd., "UMERIT 1540F", MFR=4.0 g/10 min)

Random polypropylene having melting point of 132° C. (manufactured by Sumitomo Chemical Co., Ltd., "NOBLEN S131", MFR=1.5 g/10 min)

Linear low density polyethylene having melting point of 121° C. (manufactured by Ube-Maruzen Polyethylene Co., Ltd., "UMERIT 2525F", MFR=2.5 g/10 min)

Linear low density polyethylene having melting point of 98° C. ("EVOLUE SP0540", manufactured by Prime Polymer Co., Ltd., MFR=3.8 g/10 min)

<Elastomer>

Styrene-ethylene-butylene-styrene block copolymer (SEBS) (manufactured by Asahi Kasei Corporation, "TUFTEC H1052") with styrene content of 20 wt %

3-2. Production of Protective Film

Example 1C

[1C] First, SEBS having a styrene content of 20 wt % and homo polypropylene (NOBLEN FS2011DG2) having a melting point of 158° C. were kneaded such that the content of the SEBS was set to 50 wt % during formation of a pressure sensitive adhesive layer, thereby preparing a pressure sensitive adhesive layer forming material (resin composition).

[2C] Next, the prepared pressure sensitive adhesive layer forming material, linear low density polyethylene having a melting point of 119° C. as a second layer (intermediate layer) forming material, and homo polypropylene (NOVATEC EA9) having a melting point of 158° C. as a first layer (outermost layer) forming material were respectively stored in three extruders.

[3C] Next, these forming materials were extruded in a melted state from these three extruders. In this manner, a laminate in a melted state in which these forming materials were laminated in layers was obtained from a co-extrusion T die. Thereafter, a protective film of Example 1C was obtained by cooling this laminate.

Examples 2C to 13C

The protective films of Examples 2C to 13C were obtained in the same manner as in Example 1C except that the kind of polyolefin used in place of the homo polypropylene (NOBLEN FS2011DG2) at 158° C. in the step [1C], the content of the elastomer contained in the pressure sensitive adhesive layer forming material prepared in the step [1C], and the average thickness of the pressure sensitive adhesive layer in the laminate formed in the step [3C] were changed as listed in Table 3.

3-3. Evaluation

The protective films of each example were evaluated according to the following method.

<1> Evaluation of Adhesive Force Before Protective Film had Undergone Heat History First, a resin substrate ("P1352", manufactured by Sumitomo Bakelite Co., Ltd.) formed by interposing a polarizer between two polycarbonate substrates (polycarbonate layers) was prepared for the protective film of each example and each comparative example. Each protective film was pressure-bonded on both surfaces of each resin substrate under a condition of a load of 0.5 kg/cm² using a roll so that the protective film was attached thereto, thereby obtaining a laminate.

Next, the obtained laminate was stored under a temperature condition of 50° C. for 12 hours, and a peel strength $T_1$ between the polycarbonate substrate and the protective film was measured in conformity with JISC-6481: 1996.

<2> Evaluation of Adhesive Force Before Protective Film had Undergone Heat History First, a resin substrate ("P1352", manufactured by Sumitomo Bakelite Co., Ltd.) formed by interposing a polarizer between two polycarbonate substrates (polycarbonate layers) was prepared for the protective film of each example and each comparative example. Each protective film was pressure-bonded on both surfaces of each resin substrate under a condition of a load of 0.5 kg/cm² using a roll so that the protective film was attached thereto, thereby obtaining a laminate.

Next, the obtained laminate was stored under a temperature condition of 150° C. for 5 minutes, and a peel strength $T_2$ between the polycarbonate substrate and the protective film was measured in conformity with JISC-6481: 1996.

The evaluation results of the protective film of each example, which had been obtained in the above-described manner, are listed in Table 3.

TABLE 3

| | | | MFR | Tensile elasticity | Example 1C | Example 2C | Example 3C | Example 4C | Example 5C | Example 6C |
|---|---|---|---|---|---|---|---|---|---|---|
| First layer | Configuration of first layer | Homo polypropylene having melting point of 158° C. "NOVATEC EA9" (wt %) | 0.5 | 1600 | | | 100 | | | |
| | | Average thickness (nm) | | | | | 20 | | | |

TABLE 3-continued

|  |  |  |  |  | Example 1C | Example 2C | Example 3C | Example 4C | Example 5C | Example 6C |
|---|---|---|---|---|---|---|---|---|---|---|
| Second layer | Configuration of second layer | Linear low density polyethylene having melting point of 119° C. "UMBRIT 1540F" (wt %) | 4.0 | 190 |  |  |  | 100 |  |  |
|  |  | Average thickness (nm) |  |  |  |  |  | 35 |  |  |
| Pressure sensitive adhesive layer | Configuration of pressure sensitive adhesive layer | Homo polypropylene having melting point of 158° C. "NOBLEN FS2011DG2" (wt %) | 2.5 | 1500 | 50 |  |  | 80 | 20 | 50 |
|  |  | Homo polypropylene having melting point of 158° C. "NOVATEC EA9" (wt %) | 0.5 | 1600 |  | 50 |  |  |  |  |
|  |  | Homo polypropylene having melting point of 158° C. "NOBLEN WF836DG3" (wt %) | 7.0 | 1500 |  |  | 50 |  |  |  |
|  |  | Block polypropylene having melting point of 155° C. "NOVATEC BC9GD" (wt %) | 0.5 | 1200 |  |  |  |  |  |  |
|  |  | Random polypropylene having melting point of 145° C. "NOVATEC EG8B" (wt %) | 0.8 | 950 |  |  |  |  |  |  |
|  |  | Random polypropylene having melting point of 132° C. "NOBLEN S131" (wt %) | 1.5 | 650 |  |  |  |  |  |  |
|  |  | Linear low density polyethylene having melting point of 121° C. "UMERIT 2525F" (wt %) | 2.5 | 200 |  |  |  |  |  |  |
|  |  | Linear low density polyethylene having melting point of 119° C. "UMERIT 1540F" (wt %) | 4.0 | 190 |  |  |  |  |  |  |
|  |  | Linear low density polyethylene having melting point of 98° C. "EVOLUE SP0540" (wt %) | 3.8 | 120 |  |  |  |  |  |  |
|  |  | Styrene-ethylene-butylene-styrene block copolymer "TJFTEC H1052" (wt %) |  |  | 50 | 50 | 50 | 20 | 80 | 50 |
|  |  | Average thickness (nm) |  |  |  |  |  | 15 |  | 5 |
| Evaluation results |  | Peel strength T$_1$ (after storage under temperature condition of 50° C. for 12 hours) (N/25 nm) |  |  | 0.15 | 0.05 | 0.30 | 0.05 | 0.70 | 0.10 |
|  |  | Peel strength T$_2$ (after storage under temperature condition of 150° C. for 5 minutes) (N/25 nm) |  |  | 0.35 | 0.30 | 1.60 | 0.20 | 2.00 | 0.15 |

|  |  |  | Example 7C | Example 8C | Example 9C | Example 10C | Example 11C | Example 12C | Example 13C |
|---|---|---|---|---|---|---|---|---|---|
| First layer | Configuration of first layer | Homo polypropylene having melting point of 158° C. "NOVATEC EA9" (wt %) |  |  |  | 100 |  |  |  |
|  |  | Average thickness (nm) |  |  |  | 20 |  |  |  |
| Second layer | Configuration of second layer | Linear low density polyethylene having melting point of 119° C. "UMBRIT 1540F" (wt %) |  |  |  | 100 |  |  |  |
|  |  | Average thickness (nm) |  |  |  | 35 |  |  |  |
| Pressure sensitive adhesive layer | Configuration of pressure sensitive adhesive layer | Homo polypropylene having melting point of 158° C. "NOBLEN FS2011DG2" (wt %) | 50 |  |  |  |  |  |  |
|  |  | Homo polypropylene having melting point of 158° C. "NOVATEC EA9" (wt %) |  |  |  |  |  |  |  |
|  |  | Homo polypropylene having melting point of 158° C. "NOBLEN WF836DG3" (wt %) |  |  |  |  |  |  |  |
|  |  | Block polypropylene having melting point of 155° C. "NOVATEC BC9GD" (wt %) |  | 50 |  |  |  |  |  |
|  |  | Random polypropylene having melting point of 145° C. "NOVATEC EG8B" (wt %) |  |  | 50 |  |  |  |  |
|  |  | Random polypropylene having melting point of 132° C. "NOBLEN S131" (wt %) |  |  |  | 60 |  |  |  |
|  |  | Linear low density polyethylene having melting point of 121° C. "UMERIT 2525F" (wt %) |  |  |  |  | 80 |  |  |
|  |  | Linear low density polyethylene having melting point of 119° C. "UMERIT 1540F" (wt %) |  |  |  |  |  | 80 |  |
|  |  | Linear low density polyethylene having melting point of 98° C. "EVOLUE SP0540" (wt %) |  |  |  |  |  |  | 90 |
|  |  | Styrene-ethylene-butylene-styrene block copolymer "TJFTEC H1052" (wt %) | 50 | 50 | 50 | 40 | 20 | 20 | 10 |
|  |  | Average thickness (nm) | 30 |  |  | 15 |  |  |  |
| Evaluation results |  | Peel strength T$_1$ (after storage under temperature condition of 50° C. for 12 hours) (N/25 nm) | 0.25 | 0.20 | 0.05 | 0.10 | 1.20 | 1.30 | 2.00 |
|  |  | Peel strength T$_2$ (after storage under temperature condition of 150° C. for 5 minutes) (N/25 nm) | 0.80 | 0.50 | 1.70 | 1.80 | 2.00 | 2.00 | 2.50 |

As listed in Table 3, in the protective film of each example, since the polyolefin was contained in the pressure sensitive adhesive layer, the peel strength $T_1$ and the peel strength $T_2$ were respectively set to be in a range of 0.05 N/25 mm to 3.0 N/25 mm. Therefore, in a case where the protective film of each example was used, it was found that the punching and the heat bending of the resin substrate in the step [2] and the step [3] were able to be performed without peeling the protective film off from the resin substrate, and the protective film was attached to the resin substrate to the extent that the peeling of the protective film off from the resin substrate in the step [4] was able to be performed even in a case where the protective film had undergone heat history due to the heat bending in the step [3].

INDUSTRIAL APPLICABILITY

According to the present invention, it is possible to provide a protective film which forms a gripping part with a part of the protective film that protrudes from an edge of a resin substrate in the surface direction of the resin substrate and can be smoothly peeled off from the resin substrate using this gripping part as a starting point without taking time and labor, at the time of peeling the protective film off from the resin substrate after heat bending is performed on the resin substrate. Therefore, the present invention has industrial applicability.

REFERENCE SIGNS LIST

10: protective film
11: pressure sensitive adhesive layer
15: base material layer
16: first layer
17: second layer
21: resin substrate
23: polarizer
24: coating layer
30: polycarbonate layer
100: laminate
200: lens for sunglasses

The invention claimed is:

1. A protective film for a resin substrate performing heat bending, comprising:
   a base material layer; and
   a pressure sensitive adhesive layer configured to be positioned between the base material layer and the resin substrate and to be adhered to the resin substrate,
   wherein the base material layer comprises a laminate having a first layer and a second layer, the first layer of the laminate includes a thermoplastic resin, and has a melting point of 150° C. or higher such that the first layer forms a gripping part protruding from an edge of the resin substrate in a surface direction of the resin substrate for peeling the protective film off from the resin substrate after heat bending, and the second layer of the laminate is positioned between the first layer and the pressure sensitive adhesive layer includes a thermoplastic resin, and has a melting point of 116° C. or lower such that the second layer melts or softens during the heat bending.

2. The protective film according to claim 1, wherein the thermoplastic resin in the first layer and the thermoplastic resin in the second layer are polyolefins.

3. The protective film according to claim 1, wherein the pressure sensitive adhesive layer includes a polyolefin and an elastomer.

4. The protective film according to claim 3, wherein the elastomer in the pressure sensitive adhesive layer includes a styrene-olefin-styrene block copolymer.

5. The protective film according to claim 3, wherein a melt flow rate of the polyolefin in the pressure sensitive adhesive layer which is measured under conditions of a heating temperature of 230° C. and a load of 2.16 kgf in conformity with JIS K7210 is in a range of 0.5 g/10 min to 10.0 g/10 min.

6. The protective film according to claim 3, wherein the polyolefin in the pressure sensitive adhesive layer includes a homopolymer of polypropylene.

7. The protective film according to claim 1, wherein the protective film is configured to be attached to both surfaces of the resin substrate.

8. The protective film according to claim 1, wherein the resin substrate includes a coating layer comprising a single layer or a laminate including at least one layer selected from a polycarbonate resin layer, a polyamide resin layer, and a cellulose resin layer, and the coating layer is forming one surface, the other surface, or both surfaces of the resin substrate.

9. The protective film according to claim 1, wherein the resin substrate is subjected to the heat bending by press molding or vacuum molding.

10. The protective film according to claim 4, wherein a melt flow rate of the polyolefin in the pressure sensitive adhesive layer which is measured under conditions of a heating temperature of 230° C. and a load of 2.16 kgf in conformity with JIS K7210 is in a range of 0.5 g/10 min to 10.0 g/10 min.

11. The protective film according to claim 4, wherein the polyolefin in the pressure sensitive adhesive layer includes a homopolymer of polypropylene.

12. The protective film according to claim 5, wherein the polyolefin in the pressure sensitive adhesive layer includes a homopolymer of polypropylene.

13. The protective film according to claim 2, wherein the pressure sensitive adhesive layer includes a polyolefin and an elastomer.

14. The protective film according to claim 13, wherein the elastomer in the pressure sensitive adhesive layer includes a styrene-olefin-styrene block copolymer.

15. The protective film according to claim 13, wherein a melt flow rate of the polyolefin in the pressure sensitive adhesive layer which is measured under conditions of a heating temperature of 230° C. and a load of 2.16 kgf in conformity with JIS K7210 is in a range of 0.5 g/10 min to 10.0 g/10 min.

16. The protective film according to claim 14, wherein a melt flow rate of the polyolefin in the pressure sensitive adhesive layer which is measured under conditions of a heating temperature of 230° C. and a load of 2.16 kgf in conformity with JIS K7210 is in a range of 0.5 g/10 min to 10.0 g/10 min.

17. The protective film according to claim 13, wherein the polyolefin in the pressure sensitive adhesive layer includes a homopolymer of polypropylene.

18. The protective film according to claim 14, wherein the polyolefin in the pressure sensitive adhesive layer includes a homopolymer of polypropylene.

19. The protective film according to claim 15, wherein the polyolefin in the pressure sensitive adhesive layer includes a homopolymer of polypropylene.

20. The protective film according to claim 1, wherein the melting point of the second layer is in a range of 105° C. to 115° C.

* * * * *